United States Patent Office 3,406,281
Patented Oct. 15, 1968

3,406,281
PROFIT ANALYSIS COMPUTER
William E. Buchanan, Pacific Palisades, and Steven C. Jellum, Northridge, Calif., assignors to North American Rockwell Corporation, a corporation of Delaware
Filed Oct. 5, 1964, Ser. No. 401,464
3 Claims. (Cl. 235—193)

ABSTRACT OF THE DISCLOSURE

A device for quickly computing profits of portions of a contract including profit subtotals and the profit grand total. Known values of contract portions are registered on dials and multiplied by known profit rates registered on associated dials. The products of these individual contract portions are added together and read out on a meter. Other factors such as risk factors capable of influencing the profit picture are added together and likewise are read out on a meter. The subtotals are then added to show the profit grand total.

---

Figure 1:
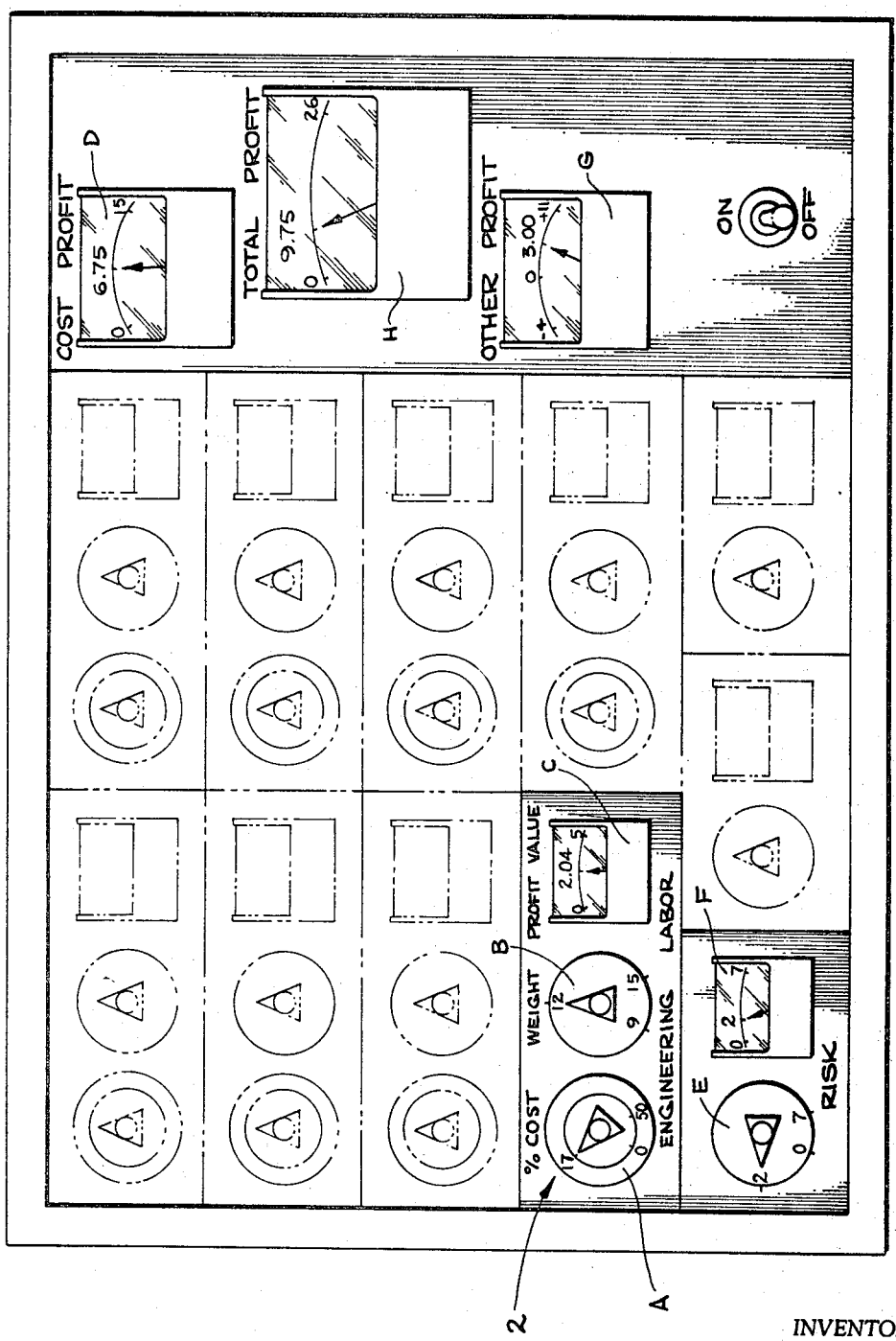

This invention relates to an apparatus and method for computing profits for a weighted guide lines system.

More particularly, this invention relates to a method and apparatus for quickly computing profits which are negotiated according to a weighted guide lines system such as set forth in the United States Armed Services Procurement Regulations.

The computation of profits in Government contracts with industrial contractors has long been a rather complicated system and which is dependent on a number of variables. For example, in the negotiation of the cost plus fixed fee (CPFF) type of contract, the estimated cost of performance under the contract is computed by adding up the increments of cost and then adding a fixed profit fee. Thus, the contractor in performing under the contract receives a fixed pre-determined amount for profit. This is one of the more simple ways of computing profit. However, even in this type of contract, there must be a guide line in determining the amount of profit which typically is negotiated between the contractor and the Government. Another type of contract is the cost plus incentive fee (CPIF) type of contract in which the costs are estimated and if performance is superior to that originally contemplated, the contractor will receive a bonus. Another type of contract is a fixed price type of contract in which the contractor performs under the contract for a set price. The set price includes all profit, if any.

Under the Armed Services Procurement Regulations, a procedure has been developed for the initial computation of profits based on estimated costs and other factors. These estimated costs are the total of various inputs, each of which has a profit figure attached thereto. For example, if the contract calls for engineering labor as a portion thereof, a typical negotiation will estimate the cost of the engineering labor and then apply a percentage profit to that cost input based on the weighted guide line system in the Armed Services Procurement Regulations (ASPR). Likewise, any manufacturing labor, sub-contracting, materials and other inputs are likewise computed on paper and at the negotiation or bargaining table are submitted to the Contracting Officer for approval. Throughout these processes of negotiations, many pages of computations and written data are changed manually which results in a long, burdensome and costly procedure. It is to obviate many of the disadvantages of the prior negotiating means and methods to which this invention is directed.

Basically, this invention comprises in its preferred embodiment an analog computer, which, by a simple manipulation of dials, provides an instantaneous picture of profit both in sub-totals and totals. On each dial of a series of dials are placed the percentage of total cost contributed by each of any number of inputs which in the illustrated embodiment comprises eight. Another dial is set for each of these increments of cost input in terms of percent or weight factor. The sum of the products of the first and second dials are added to give a cost profit figure. On another set of dials are other factors such as risk, performance and selected factors to which a profit value or weight factor is attached and which is independent of the total cost of the propect but which represents percentages. The percentage total from the total cost input category is added to the separate profit figures to give a total profit picture. Should any portion of the inputs be changed, a simple dialing procedure is utilized to obviate the necessity for additional manual calculations.

An object of this invention is to provide an improved method of computing profits in contract negotiations.

Another object of this invention is to provide an apparatus for computing profits in contract negotiations.

Figure 2:
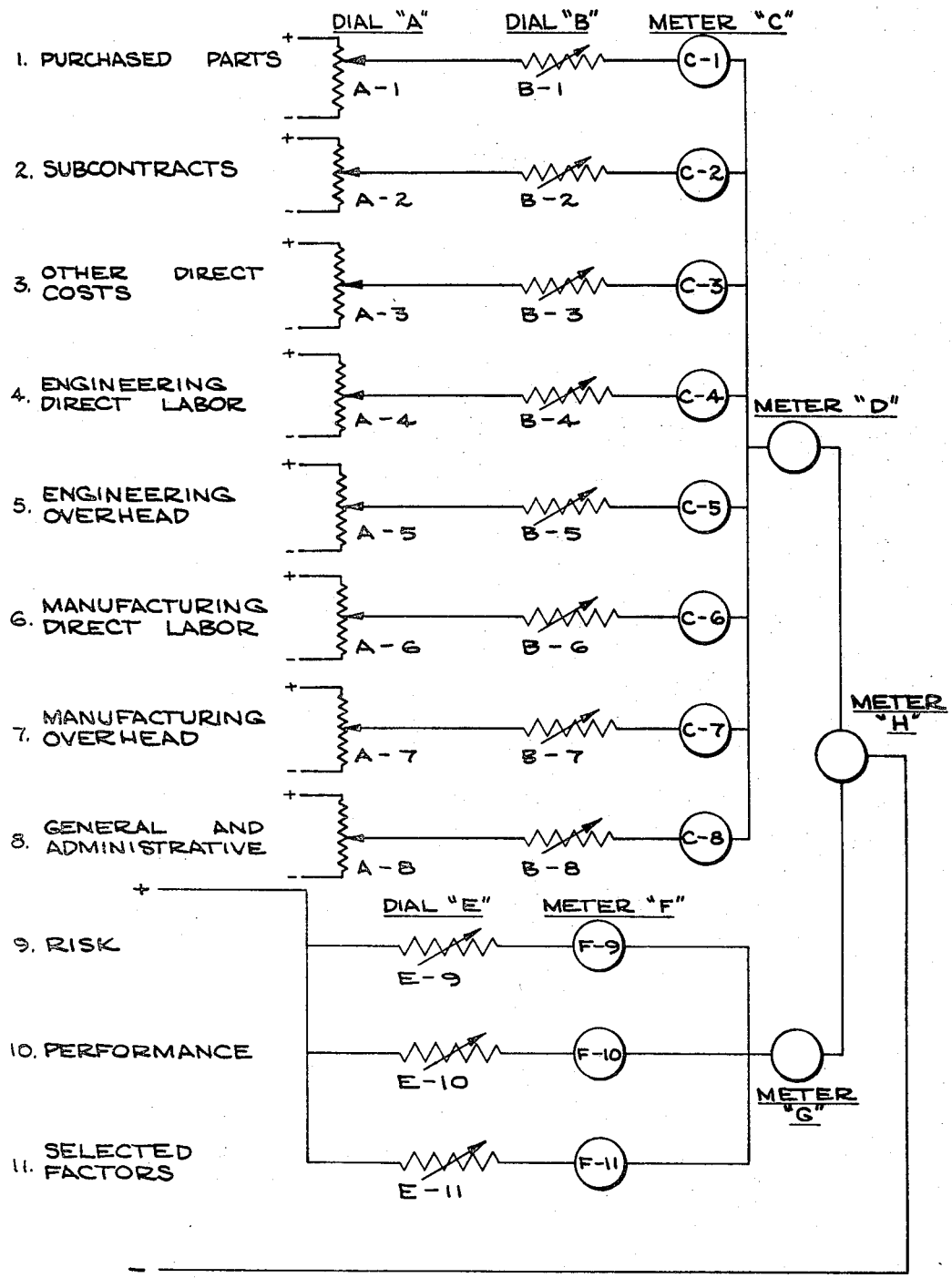

Other objects and advantages of this invention will become apparent as this description proceeds taken in conjunction with the drawings in which:

FIG. 1 is a plan view of the computer with two selected computer elements in detail which provide the inputs to the total profit picture, and FIG. 2 is a schematic circuit diagram of one embodiment of this invention.

FIG. 1 illustrates a plan view of a preferred embodiment of this invention with only a portion of the dials and meters shown for simplicity. Shown at FIG. 2 are the dials and meter for one cost input and in the illustration is shown as constituting engineering labor. The percentage of the total cost of forming the contract which constitutes engineering labor is placed on dial A directly in terms of percent. In the illustrated example which is discussed later in this description, asuming that the total estimated cost of the contract without figuring in the profit is $2,350,000 and that the engineering labor portion of the contract constitutes $400,000, it can be seen that the percent of total cost attributed to engineering labor would be 17 percent. This figure is dialed on dial A and as seen in FIG. 1, is set at 17. On dial B is placed the percent of profit on the engineering labor portion of the contract. This range is spelled out in the Armed Services Procurement Regulations as lying between 9 and 15 percent. In the illustrated embodiment, a figure of 12 percent is placed. Meter C is the total reading of profit on the engineering labor portion of the contract and is a product of the percent or weight of dial B and the percentage of dial A resulting in a meter C reading of 2.04. In a similar manner, all of the other cost inputs and the weights attached thereto are placed on the dials remaining in the assembly, the total of which will be shown in the meter D reading which totals 6.75.

The risk factor which will differ according to the type of contract involved has its own dial setting which is separate and apart from the various percentages entering into total cost input. In this particular case, the ASPR regulations apply a factor corresponding to risk with a range of between 0 and 7 percent. Factors which enter into this computation are the type of contracts such as CPFF, CPIF or FPI and the difficulty of the contract task. In the illustrated embodiment, the dial E setting for illustrative purposes is placed in this range and is assumed to be 2.00 percent which is readable on meter F. In a similar manner, the factors entering into the performance and selected other factors are placed on their corresponding dials. The meter readings along with the risk factor, add up on meter G to give a total of 3.00 percent. Meter G and meter D are added together on meter H to arrive at a total profit picture of 9.75 percent. Table I summarizes these readings.

is computed using the figure derived by dividing the corresponding figure in column B by the total contract cost. For example, in the purchased parts category, the figure $100,000 divided by $2,350,000 gives a dial A setting which is 4.25 percent. Since ASPR gives the range in percent allowable (weight factor), this weight factor is placed in column E, which in the case of purchased parts has a range of 1–4 percent (column D). On Dial B (column E) is the selected weight factor which in most cases is relatively arbitrary within the allowed range depending on past experience and in the illustrated table is selected as being 2. The meter C reading then will be a product of the dial B and dial A setting and if interpreted in percent will be .09.

By similar manner, all the other cost inputs are deter-

TABLE I

| Column A | Column B | Column C | Column D | Column E | Column F | Column G | Column H |
|---|---|---|---|---|---|---|---|
| Category | Estimated Cost (Dollars) | Dial "A" Setting (percent of total cost) | Range in percent of weight factor (ASPR) | Dial "B" Selected Weight Factor setting in percent | Meter "C" Reading in percent | Meter "D" Reading in percent | Meter "H" Reading in percent |
| 1. Purchased Parts | (200,000) 100,000 | (8.50) 4.25 | 1–4 | 2 ((4)) | (.17) .09 | | |
| 2. Sub Contracts | 100,000 | 4.25 | 1–5 | 3 ((3)) | ((.17)) .13 | | |
| 3. Other Direct Costs | 100,000 | 4.25 | 1–4 | 2 ((14)) | ((.13)) .09 | | |
| 4. Eng. Direct Labor | 400,000 | 17.00 | 9–15 | 12 ((8)) | ((2.38)) 2.04 | | |
| 5. Eng. Overhead | 450,000 | 19.00 | 6–9 | 7 | ((1.52)) 1.33 | | |
| 6. Mfg. Direct Labor | (460,000) 500,000 | (19.75) 21.00 | 5–9 | 7 | (1.37) 1.47 | | |
| 7. Mfg. Overhead | (540,000) 600,000 | (23.00) 26.00 | 4–7 | 5 | (1.15) 1.30 | | |
| 8. Gen. and Adm | 100,000 | 4.25 | 6–8 | 7 | .30 | | |
| Total | 2,350,000 | 100.00 | | | | (7.19) ((7.36)) 6.75 | |

| Category | | | Range in percent of weight factor (ASPR) | Dial "E" selected weight factor setting in percent | Meter "F" Reading in percent | Meter "G" Reading in percent | |
|---|---|---|---|---|---|---|---|
| 9. Risk | — | — | 0–7 | ((3.00)) 2.00 | 2.00 | | |
| 10. Performance | | | −2,+2 | (+0.50) +1.00 | (+0.50) +1.00 | | |
| 11. Selected Factors | | | −2,+2 | ((+1.00)) 0.00 | ((+1.00)) 0.00 | | |
| | | | | | | (4.50) ((5.00)) 3.00 | |
| Grand Total | | | | | | | (11.69) ((12.36)) 9.75 |

Numbers in ( ) indicate preliminary contractor calculations.
Numbers in (( )) indicate final contractor calculations.
Remaining numbers indicate finally negotiated costs and profits.

Shown in FIG. 2 is a schematic circuit diagram of the preferred embodiment of this invention. The various dials A which correspond to the various cost inputs shown in the column on the left of Table I including purchase parts, sub-contracts, other direct costs, etc. comprise a simple variable resistor type dial. Likewise, dial B is similarly constructed so that by manipulating the dials, a reading on the meters C is obtained. These are summed on meter D. As to the risk, performance and selected factors, since there is no percent of total cost input to be considered, only the dials E are used which gives readings on meters F. These meter readings are added to arrive at a total reading or summation in meter G, which along with meter D, will add to give a reading on meter H which is the total percentage profit.

Table I illustrates a sample computation which can either be arrived at manually as in the past or by means of the dial settings according to this invention. In column A is represented the category of cost inputs, the sum of which add up to the total cost of the contract. For example, omitting for now the portions in paranthesis, there is estimated cost in dollars placed in column B for each of the enumerated inputs. These costs are added to give a total which is $2,350,000. In column C, a dial A setting mined and the various dial settings arrived at. Meter D (column G) then summarizes the totals of the meter C readings and gives a percentage figure based on the cost inputs. This represents a straightforward profit percentage determination based solely on the cost input which totals $2,350,000.

However, there are factors other than profits based on each of the individual inputs which must be considered in the negotiation of profits and contracts. Such factors are risk, performance and selected other factors. Over and above the original calculated profit as enumerated above, these factors must be taken into consideration. For example, in the category of risk, factors that enter into the selected percent profit are the type of contract being negotiated such as CPFF, FPI or various other types of contract, each of which have a percentage range spelled out in the Armed Services Procurement Regulations. Other factors which enter into the estimate of cost are the reasonableness of the contractor's cost estimates history. Finally, the difficulty of the contract task as viewed as a whole is a factor in determining the range. As to the record of contractor's performance, which is set in column 10 labelled "Performance," such factors as the contractor's management, cost efficiency, past performances and other factors are examined to select the percentage within the given range. Finally, a third factor is the selected factor category which includes whether the contractor's resources are being utilized extensively in the performance of the contract or whether the Government's facilities are being used. The source of financial support and other miscellaneous factors are also utilized in determining the percent of profit within the enumerated range.

The three categories of risk, performance and selected factors are each given their respective weights and the dial E setting is set in terms of percent. The meter F readings will give these readings in terms of percent and the sum of all of meter F's readings added to give a meter G reading. Finally, the reading of meter G and the reading of meter D are added and as shown in the illustrated embodiment are summarized to give a grand total of 9.75 percent as shown on meter H. The total profit in dollars is simply obtained by multiplying 9.75 times the total cost of $2,350,000 which is approximately $229,000.

To illustrate how the dials can be changed instantaneously to represent disputed areas in negotiating the contract, various figures have been placed in either single or double parenthesis. Referring to line 1, purchased parts, a figure of $200,000 in single parenthesis is shown above the final arrived at figure of $100,000. The number in the single parenthesis indicates the preliminary contractor calculation in arriving at figures to be submitted to the Government prior to negotiation. Originally, it was considered that purchased parts would amount to $200,000 and in column C (in parenthesis), it can be seen that this should represent 8.50 percent of a total contract cost. Likewise, the manufacturing direct labor and the manufacturing overhead original figures shown in parenthesis in column B are $460,000 and $540,000 respectively. The dial A setting which represents the percent of total cost would be 19.75 and 23.00 respectively. However, since the range of percent allowable under the ASPR regulations in manufacturing direct labor and manufacturing overhead categories is higher than in the purchased parts portion, and since there was some excess capacity (presumed) in the contractor's plant, it would be to the advantage of the contractor to make these parts itself rather than purchasing them. Accordingly, only the necessary parts to be purchased which represents $100,000 was selected and a simple dial setting A changed to 4.25. In a like manner, the manufacturing direct labor and manufacturing overhead costs $460,000 and $540,000 were changed to $500,000 and $600,000, respectively, arriving at percentages of 21.00 and 26.00, respectively, in column C. As seen in the meter C readings, the percent profit has been changed so that the purchased parts portion of the profit has been reduced slightly from .17 to .09 while the manufacturing direct labor and manufacturing overhead percentage costs have been raised by a greater amount, .10 and .15, respectively. This changes the profit picture to the advantage of the contractor by allowing the contractor a net .17 percent greater profit (see column G).

When final negotiations between the contractor and the Contracting Officer were undertaken, the table shows the final figures arrived at as numbers without parenthesis. Thus, it can be seen that in the sub-contracts category shown in line 2, the selected weight factor in percent which had to fall between 1 and 5 percent was changed from 4 percent to 3 percent during negotiation. The meter C reading in percent profit was accordingly changed to .13 percent. In like manner, the other direct cost category was changed from 3 percent to 2 percent profit and the meter C reading changed accordingly. Likewise, in engineering overhead, the Contracting Officer evidently felt that the weight factor 8 was too high and that 7 was a more reasonable estimate. Although the estimated costs were not changed by the Contracting Officer who felt that the contractor's estimates were reasonable, it can be seen that the estimated cost in dollars could likewise be changed so as to vary the percentages. For example, should the Contracting Officer claim that any of the categories were too high such as enginering direct labor, the figure of $400,000 could be changed to a lower figure thus changing the percentage of total cost.

In a like manner, the Contracting Officer in the sample changed the risk factor in column 9, dial E from 3.00 percent to 2.00 percent and changed the other selective factors figure from 1.00 to 00.00 percent. Thus, it can be seen that the final total is 9.75 percent.

It should be noted that the performance and other selected factors category are shown as having a possible minus value. This is a simple matter in the circuitry to account for since the zero setting would be set at −2 for both categories and the readable face changed so that −2 would represent a zero current.

Another advantage of the instant device resides in its relative accuracy. For example, should the column C setting be off by a factor of 10, the column F or meter C reading is off by a much less factor. A 10 percent error in the meter C reading only amounts to a negligable amount in the total percentage picture.

The advantages of the instant device are varied and many. Not only is a simple tool provided enabling contractors, negotiators, Contracting Officers and contract analyzers to instantaneously and with a clear picture of all factors obtain accurate results, but the necessity for practically all calculations of a manual nature are eliminated. The device also has a great deal of value as a training aid in teaching negotiators the weighted guide line system of contract profit negotiation. Finally, a simultaneous display of all factors entering into the contract negotiation is available.

While the preferred embodiment has been illustrated as an electrical device, it is within the scope of this invention to use a mechanical or electronic configuration. For example, instead of electrical circuits, the dials could operate a gear train and mechanical linkage to produce the analog results. Electronically, the circuit can include amplifier elements with variable bias triodes to vary the inputs for each category of cost and weights to produce analog signals.

In conclusion, we wish it to be understood that the foregoing description and drawing are representative only of one embodiment of the invention and that modifications will occur to those skilled in the art without departing from the spirit and scope of the invention as defined by the appended claims.

What is claimed is:

1. A profit computer for contract negotiation comprising:
   a series of first dial means for producing first signals, each of said first dial means having indicia thereon corresponding to a percentage of a total contract cost,
   a series of second dial means for producing second signals, each of said second dial means having indicia thereon corresponding to a weight factor for one of said first dial means and being operatively connected to said first dial means,
   a series of first meter means responsive to said first and second signals, each of said first meter means having indicia thereon corresponding to the product of said first and second dial means,
   a second meter means having indicia thereon corresponding to the sum of said first meter means,
   a third dial means for producing third signals, said third dial means having indicia thereon corresponding to a weight factor, independently variable from said first mentioned weight factor,
   a third meter means responsive to said third signals, said third meter means being in series with said third dial means and said second meter means having indicia corresponding to the sum of said third dial means and said second meter means.

2. A profit computer for contract negotiation comprising;
- a first series of variable resistors arranged in a parallel circuit, each of said variable resistors being operatively connected to a dial means having indicia thereon corresponding to a percentage of a total input cost of a contract,
- a second series of variable resistors arranged in a parallel circuit, each of said second resistors being in series with one of said first variable resistors and being operatively conected to a dial means having indicia thereon corresponding to a weight factor,
- a first series of meters arranged in a parallel circuit, each of said meters being in series with a first and second variable resistor and having indicia thereon corresponding to the product of the first and second dial indicia,
- a second meter means in series with each of said first meters and having indicia thereon corresponding to the sum of the readings of said first meters,
- a third series of variable resistors each of said resistors being operatively connected to a dial means having indicia thereon corresponding to a percentage of profit, independently variable from said weight factor,
- a third meter in series with said third series of variable resistors and in parallel with said second meter means, said third meter having indicia thereon corresponding to the algebraic sum of the percentage setting of said variable resistors,
- a fourth meter means in series with said second and third meter means and having indicia thereon corresponding to the algebraic sum of said second and third meter means.

3. A computer for determining contract profits comprising;
- a plurality of first dial means, each of said dial means set in accordance to a predetermined percentage figure corresponding to the percent of cost contributed by an element to the total contract cost to produce an analog signal,
- a plurality of second dial means, each of said second dial means being positioned to receive a signal from an associated dial of said first dial means and set in accordance to a predetermined weight factor to modify the analog signal produced by said first dial means,
- a plurality of first meter means, each of said meter means being positioned to receive the modified signal from end of said second dial means and to give a reading in response thereto,
- second meter means being positioned to receive the modified analog signal from all of said second dial means and to give a reading corresponding to the sum of the readings of said first meter means,
- third dial means being set in accordance to a predetermined percentage figure to produce at least one analog signal, the figures of said third dial means being independent of the figures of said first dial means and said weight factors of said second dial means,
- third meter means being positioned to receive the signals from said third dial means and to give a reading corresponding to the algebraic sum of said third dial settings,
- fourth meter means being positioned to receive signals from all of said third dial means and all of second dial means to give a reading representing the sum thereof.

References Cited

UNITED STATES PATENTS

| | | | |
|---|---|---|---|
| 2,178,314 | 10/1939 | Saxe | 235—193 |
| 3,018,050 | 1/1962 | Barrell | 235—193 |
| 3,270,190 | 8/1966 | Lambert | 235—184 |

MALCOLM A. MORRISON, *Primary Examiner.*

J. RUGGIERO, *Assistant Examiner.*